(12) United States Patent
Wang et al.

(10) Patent No.: US 12,211,450 B2
(45) Date of Patent: Jan. 28, 2025

(54) DISPLAY PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Miao Wang, Beijing (CN); Jingwen Zhang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/023,676

(22) PCT Filed: May 23, 2022

(86) PCT No.: PCT/CN2022/094530
§ 371 (c)(1),
(2) Date: Feb. 27, 2023

(87) PCT Pub. No.: WO2023/225816
PCT Pub. Date: Nov. 30, 2023

(65) Prior Publication Data
US 2024/0274086 A1    Aug. 15, 2024

(51) Int. Cl.
  *G09G 3/36* (2006.01)
  *G09G 3/3233* (2016.01)
  *G09G 3/3266* (2016.01)

(52) U.S. Cl.
  CPC ......... *G09G 3/3266* (2013.01); *G09G 3/3233* (2013.01); *G09G 2300/0408* (2013.01); *G09G 2300/0819* (2013.01); *G09G 2300/0842* (2013.01); *G09G 2300/0861* (2013.01);
(Continued)

(58) Field of Classification Search
  None
  See application file for complete search history.

(56) References Cited

U.S. PATENT DOCUMENTS 10,223,992 B2 *   3/2019   Du .................. G09G 3/3677
2006/0034125 A1   2/2006   Kim et al.
2008/0198283 A1   8/2008   Yoon et al.
(Continued)

FOREIGN PATENT DOCUMENTS

CN   1734547 A     2/2006
CN   101251692 A   8/2008
(Continued)

*Primary Examiner* — Carl Adams
(74) *Attorney, Agent, or Firm* — IPro, PLLC

(57) ABSTRACT

A display panel and a display device are provided, which belong to the field of display technologies. The display panel includes: a substrate including a display region and a gate driver on array (GOA) region, a plurality of rows and a plurality of columns of pixels disposed in the display region, and a first GOA circuit disposed in the GOA region. The first GOA circuit includes a plurality of cascaded first shift register units, and the plurality of first shift register units are coupled to the plurality of rows of pixels by a plurality of gate lines, and are configured to transmit gate drive signals to the plurality of rows of pixels through the plurality of gate lines, to drive the plurality of rows of pixels to emit light.

19 Claims, 10 Drawing Sheets

(52) U.S. Cl.
CPC ............... *G09G 2310/0286* (2013.01); *G09G 2320/0233* (2013.01)

(56) References Cited

U.S. PATENT DOCUMENTS

| | | |
|---|---|---|
| 2016/0005767 A1 | 1/2016 | Shen |
| 2017/0352843 A1 | 12/2017 | Kim et al. |
| 2019/0279574 A1 | 9/2019 | Kim et al. |
| 2022/0036847 A1* | 2/2022 | Cheng .................. G09G 3/3688 |
| 2022/0036849 A1 | 2/2022 | Cheng et al. |
| 2022/0334440 A1 | 10/2022 | Wu et al. |
| 2023/0023708 A1 | 1/2023 | Fan et al. |

FOREIGN PATENT DOCUMENTS

| | | |
|---|---|---|
| CN | 103792746 A | 5/2014 |
| CN | 106448519 A | 2/2017 |
| CN | 106875890 A | 6/2017 |
| CN | 107479266 A | 12/2017 |
| CN | 111522161 A | 8/2020 |
| CN | 111883077 A | 11/2020 |
| CN | 114447029 A | 5/2022 |
| WO | 2023142052 A1 | 8/2023 |

\* cited by examiner

DISPLAY PANEL AND DISPLAY DEVICE

CROSS-REFERENCE TO RELATED APPLICATION

This application is a U.S. national stage of international application No. PCT/CN2022/094530, filed on May 23, 2022, the disclosures of which are incorporated herein by reference in its entirety.

TECHNICAL FIELD

The present disclosure relates to the field of display technology, and in particular to a display panel and a display device.

BACKGROUND OF THE INVENTION

An organic light-emitting diode (OLED) display panel is widely applied to the display field for its advantages such as self-luminescence, a wide viewing angle, and a fast response speed.

In the related art, an OLED display panel usually includes: a substrate, a gate driver on array (GOA) circuit disposed on one side of the substrate, and a plurality of pixels arranged in arrays. The GOA circuit includes a plurality of cascaded GOA units. The GOA circuit may also be referred to as a gate drive circuit, and the GOA units may also be referred to as shift register units. The plurality of GOA units are all disposed on the same side of a plurality of pixels extending in a row direction, and are coupled to the plurality of rows of pixels, to provide gate drive signals to the plurality of rows of pixels to drive the plurality of rows of pixels to emit light, for the OLED display panel to implement display.

SUMMARY OF THE INVENTION

According to an aspect, a display panel is provided. The display panel includes:
- a substrate, wherein the substrate includes a display region and a (GOA) region at least partially surrounding the display region;
- a plurality of gate lines, wherein the plurality of gate lines are disposed in the display region and the GOA region, each of the plurality of gate lines extends in a row extension direction, the plurality of gate lines are arranged in a column extension direction, and the row extension direction is intersected with the column extension direction;
- a first GOA circuit, wherein the first GOA circuit is disposed in the GOA region, the first GOA circuit includes a plurality of cascaded first shift register units, part of the plurality of first shift register units are disposed on one side and other first shift register units expect the part of the plurality of first shift register units are disposed on the other side in the row extension direction, and the plurality of first shift register units are coupled to the plurality of gate lines, and are configured to transmit gate drive signals to the plurality of gate lines; and
- a plurality of pixel groups, wherein the plurality of pixel groups are disposed in the display region, at least one of the plurality of pixel groups includes two rows and a plurality of columns of pixels arranged in an array in the row extension direction and the column extension direction, and two rows of pixels in the at least one pixel group are coupled to two gate lines of the plurality of gate lines, and the two rows of pixels are configured to emit light based on gate drive signals on the two gate lines, wherein in at least one row of pixels included in the at least one pixel group, part of the pixels are coupled to one of the two gate lines coupled to the at least one pixel group, other pixels expect the part of the pixels are coupled to the other one of the two gate lines coupled to the at least one pixel group, and first shift register units coupled to the one of the two gate lines and first shift register units coupled to the other one of the two gate lines are disposed on different sides.

Optionally, each of the pixels includes a pixel circuit and a light-emitting element, the pixel circuit is respectively coupled to the gate line and the light-emitting element, and the pixel circuit is configured to transmit a light emission drive signal to the light-emitting element in response to the gate drive signals on the plurality of gate lines, to drive the light-emitting element to emit light.

Optionally, the light-emitting element included in each pixel of the part of the pixels and the light-emitting element included in each pixel of the other pixels are disposed in a same row;
- the pixel circuit and the light-emitting element included in each pixel of the part of the pixels are disposed in different rows; and
- the pixel circuit and the light-emitting element included in each pixel of the other pixels are disposed in a same row.

Optionally, the light-emitting element included in each pixel of the part of the pixels and the light-emitting element included in each pixel of the other pixels are disposed in a same row;
- the pixel circuit and the light-emitting element included in each pixel of the part of the pixels are disposed in a same row; and
- the pixel circuit and the light-emitting element included in each pixel of the other pixels are disposed in a same row.

Optionally, the at least one row of pixels includes an even number of pixels; and
- a quantity of pixels included in the part of the pixels and a quantity of pixels included in the other pixels are the same, and are equal to one half of a total quantity of pixels included in the at least one row of pixels.

Optionally, two adjacent pixels are coupled to different gate lines in the at least one row of pixels.

Optionally, the two rows of pixels included in the at least one pixel group are disposed in adjacent rows.

Optionally, the at least one row of pixels include a plurality of pixels of different colors; and
- in the plurality of pixels of different colors, part of pixels of a plurality of pixels of at least one color are coupled to the one of the two gate lines coupled to the at least one pixel group, and other pixels expect the part of the pixels are coupled to the other one of the two gate lines coupled to the at least one pixel group.

Optionally, the at least one row of pixels include a plurality of red pixels, a plurality of green pixels, and a plurality of blue pixels, and the at least one color is green.

Optionally, the display panel further includes:
- a plurality of light emission control lines, wherein the plurality of light emission control lines are disposed in the display region and the GOA region, each of the plurality of light emission control lines extends in the row extension direction, and the plurality of light emission control lines are arranged in the column extension direction; and a second GOA circuit disposed in the GOA region, wherein the second GOA circuit includes a plurality of cascaded second shift register units, part of the second shift register units are disposed on one side and other second shift register units expect the part of the second shift register units are disposed on the other side in the row extension direction, and the plurality of second shift register units are coupled to the plurality of light emission control lines, and are configured to transmit light emission control signals to the plurality of light emission control lines, wherein the two rows of pixels in the at least one pixel group are further coupled to two light emission control lines of the plurality of light emission control lines, and the two rows of pixels are configured to emit light based on light emission control signals on the two light emission control lines and the gate drive signals on the two coupled gate lines; and first shift register units coupled to the at least one row of pixels by the plurality of gate lines and second shift register units coupled to the at least one row of pixels by the plurality of light emission control lines are disposed on different sides.

Optionally, in the plurality of first shift register units, first shift register units coupled to even-numbered rows of pixels by the plurality of gate lines are disposed on the one side; and first shift register units coupled to odd-numbered rows of pixels by the plurality of gate lines are disposed on the other side; and in the plurality of second shift register units, second shift register units coupled to even-numbered rows of pixels by the plurality of light emission control lines are disposed on the one side; and second shift register units coupled to odd-numbered rows of pixels by the plurality of light emission control lines are disposed on the other side.

Optionally, the first shift register units and the second shift register units disposed on the one side are sequentially arranged in an order of one second shift register unit and one first shift register unit in the column extension direction; and the first shift register units and the second shift register units disposed on the other side are sequentially arranged in an order of one first shift register unit and one second shift register unit in the column extension direction.

Optionally, in the at least one row of pixels included in the at least one pixel group, part of the pixels are coupled to one of the two light emission control lines coupled to the at least one pixel group, and other pixels expect the part of the pixels are coupled to the other one of the two light emission control lines coupled to the at least one pixel group.

Optionally, the row extension direction is perpendicular to the column extension direction.

According to another aspect, a display device is provided. The display device includes: a power supply component and the display panel in the foregoing aspect, wherein the power supply component is coupled to the display panel, and is configured to supply power to the display panel.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer, the implementations of the present disclosure are further described below in detail with reference to the accompanying drawings.

In today's rapid development of intelligence, the market has increasingly high demand and expectation of display products, not only expecting larger display products but also expecting to enjoy higher resolution visual sensation, that is, expecting better display effects of display products. Based on this, embodiments of the present disclosure provide a display panel which not only facilitates a narrow bezel design of a display device, but also displays various images with better display effects and can meet market demand.

Figure 1:
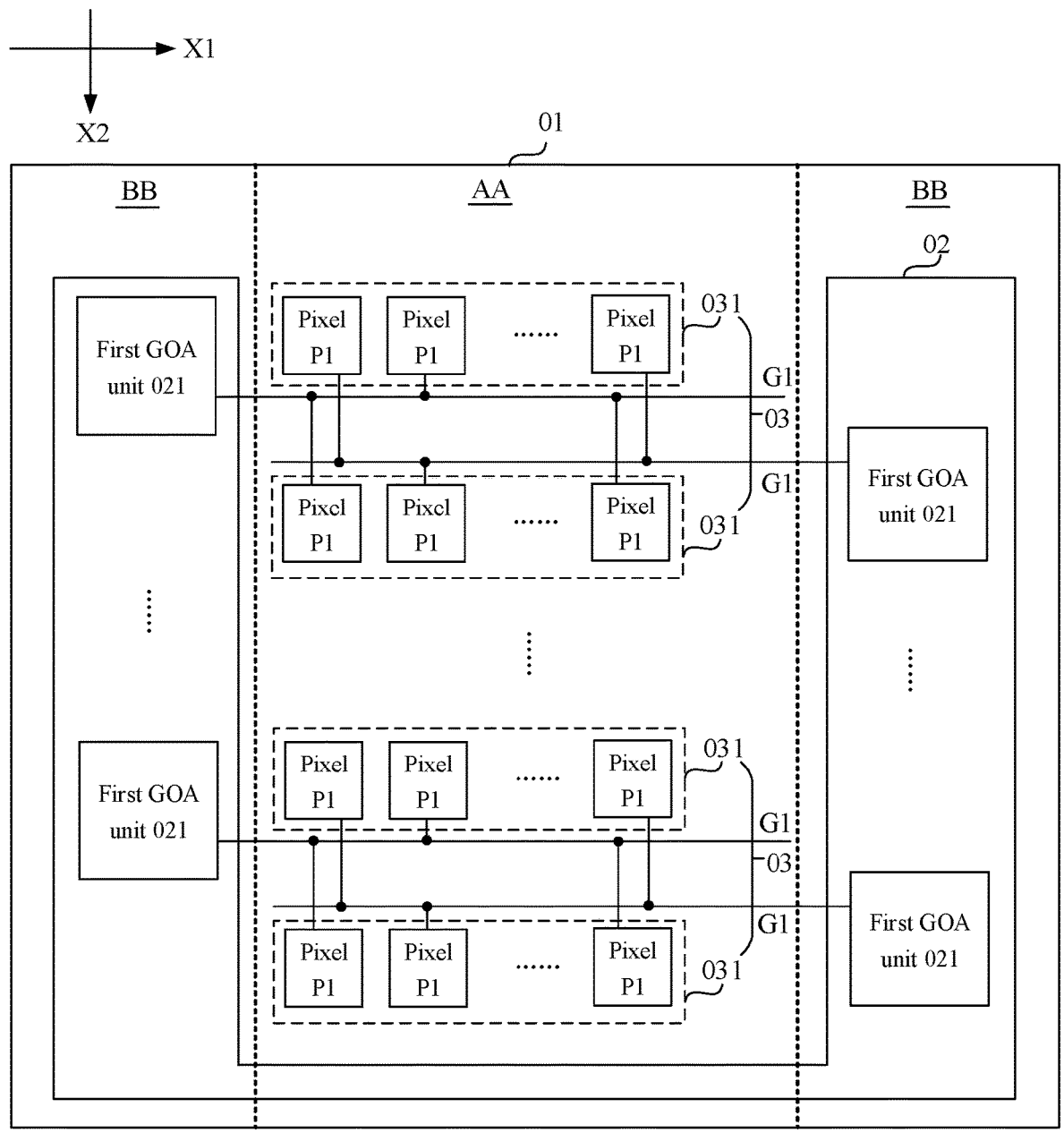
FIG. 1 is a schematic structural diagram of a display panel according to an embodiment of the present disclosure.

FIG. 1 is a schematic structural diagram of a display panel according to an embodiment of the present disclosure. As shown in FIG. 1, the display panel includes a substrate which includes a display region AA and a GOA region (a GOA region BB) at least partially surrounding the display region AA.

For example, referring to FIG. 1, in the substrate 01 shown in the FIG. 1, the GOA region BB partially surrounds the display region AA, and is disposed on left and right sides (that is, a left side and a right side) of the display region AA. Certainly, in some other embodiments, under the premise that the GOA region BB partially surrounds the display region AA, the GOA region BB may alternatively be disposed on an upper side and/or a lower side of the display region. Alternatively, the GOA region BB may surround the display region AA, that is, the display region AA is surrounded by the GOA region BB. It needs to be noted that an area of the display region AA is usually far larger than an area of the GOA region BB. The area of the display region AA and the area of the GOA region are not limited in the figure.

Continuing to refer to FIG. 1, the display panel further includes a plurality of gate lines G1. The plurality of gate lines G1 may be disposed in the display region AA and the GOA region BB. That is, for each gate line G1, one part of the gate line may be disposed in the display region AA and the other part may be disposed in the GOA region BB. The length of the one part disposed in the display region AA is usually far larger than the length of the other part disposed in the GOA region BB, which are only schematically described in the figure. In addition, each gate line G1 may extend in a row extension direction X1, and the plurality of gate lines G1 may be arranged in a column extension direction X2. The term "arranged" recorded in embodiments of the present disclosure may refer to being arranged sequentially at intervals, and is no longer described in the following embodiments.

Continuing to refer to FIG. 1 again, the display panel further includes a first GOA circuit, that is, a first GOA circuit 02. The first GOA circuit 02 may be disposed in the GOA region BB. The first GOA circuit 02 may include a plurality of cascaded first shift register units, that is, first GOA units 021. The plurality of first GOA units 021 may be coupled (that is, electrically connected) to the plurality of gate lines G1, and configured to transmit gate drive signals to the plurality of gate lines G1. Correspondingly, the first GOA circuit 02 may also be referred to as a gate drive circuit, that is, a gate GOA circuit. The first GOA units 021 may be referred to as gate GOA units.

It needs to be noted that, the plurality of cascaded first GOA units 021 may refer to that every two (which may also be referred to as two stages) first GOA units 021 are coupled to each other, and a latter first GOA unit 021 is driven by a former first GOA unit 021 to operate. In addition, the two first GOA units 021 coupled to each other here may be adjacent as shown in FIG. 1, or may be not adjacent. Moreover, the plurality of cascaded first GOA units 021 may further be coupled to a start signal terminal by one first GOA unit 021, and are configured to transmit gate drive signals to the plurality of gate lines G1 based on a start signal transmitted by the start signal terminal. With reference to FIG. 1, to facilitate wiring, the first GOA unit 021 coupled to the start signal terminal may be a first "first GOA unit 021" in the column extension direction X2, which may also be referred to as a first-stage first GOA unit 021. Next, a second-stage first GOA unit 021 is coupled to the first-stage first GOA unit 021, a third-stage first GOA unit 021 is coupled to the second-stage first GOA unit 021, and so on.

It further needs to be noted that, the plurality of first GOA units 021 and the plurality of gate lines G1 may be coupled in a one-to-one correspondence. That is, every first GOA unit 021 is coupled to one gate line G1, and the first GOA units 021 are coupled to different gate lines G1. As can be seen, a quantity of the first GOA units 021 included in the first GOA circuit 02 may be greater than or equal to a quantity of the plurality of gate lines G1.

Continuing to refer to FIG. 1 again, the display panel further includes a plurality of pixel groups 03 which are disposed in the display region AA. At least one of the plurality of pixel groups 03 may include two rows and a plurality of columns of pixels P1 arranged in the row extension direction X1 and a column extension direction Y1. That is, the at least one pixel group 03 includes two rows of pixels 031 sequentially arranged in the row extension direction. Every row of pixels 031 includes a plurality of pixels P1 arranged in the column extension direction Y1. In addition, the two rows of pixels 031 included in the at least one pixel group 03 may be coupled to two gate lines G1 in the plurality of gate lines G1, and the two rows of pixels 031 are configured to emit light based on gate drive signals on the two gate lines G1. For example, referring to FIG. 1, in the plurality of pixel groups 03 shown in the figure, every pixel group 03 includes two rows and a plurality of columns of pixels P1.

It needs to be noted that the two rows of pixels 031 included in each pixel group 03 may be coupled to two different gate lines G1 of the plurality of gate lines G1. As can be seen, the quantity of the plurality of gate lines G1 may be greater than or equal to a quantity of rows of pixels P1 included in the display panel. This embodiment of the present disclosure is described by using an example in which the quantity of the first GOA units 021 included in the first GOA circuit 02 is equal to the quantity of the plurality of gate lines G1 and is equal to the quantity of rows of pixels P1. In this case, it may be considered that the plurality of first GOA units 021 are coupled to a plurality of rows of pixels 031 by the plurality of gate lines G1, and the plurality of first GOA units 021 are configured to transmit (for example, transmit row by row) gate drive signals to the plurality of rows of pixels 031 through the plurality of gate lines G1, to drive the plurality of rows of pixels 031 to emit light. Every pixel P1 is usually further coupled to a data line in the display panel, and emits light based on a received gate drive signal, and a data signal provided by the data line.

It further needs to be noted that, the row extension direction X1 may be intersected with (that is, not parallel to) the column extension direction X2. For example, referring to FIG. 1, the row extension direction X1 and the column extension direction X2 shown in the figure are perpendicular to each other.

In embodiments of the present disclosure, in the row extension direction X1, in the plurality of first GOA units 021, part of the first GOA units 021 may be disposed on one side, and other first GOA units 021 may be disposed on the other side, that is, the plurality of first GOA units 021 may be distributed on two sides of the substrate 01 in the row extension direction X1 instead of being all disposed on the same side of the substrate 01. With reference to FIG. 1, the "two sides" here may refer to a left side and a right side. When a part of the first GOA units 021 are disposed on the left side, other first GOA units 021 may be correspondingly disposed on the right side. When a part of the first GOA units 021 are disposed on the right side, other first GOA units 021 may be correspondingly disposed on the left side. One of the two sides shown in the following embodiments of the present disclosure specifically refers to the left side, and the other one of the two sides specifically refers to the right side.

As can be seen from the BACKGROUND, at present, the plurality of cascaded first GOA units 021 in the first GOA circuit 02 are usually all disposed on the same side, which belongs to a conventional single-side drive. Research shows that the longer the signal line (which may be referred to as a gate line G1 here), the heavier the loading on the signal line and the larger the loss of a signal transmitted on the signal line. Therefore, there is a problem that an end near the first GOA units 021 and an end far away from the first GOA units 021 exist, and duration of a gate drive signal transmitted by every first GOA unit 021 to a coupled gate line G1 becomes shorter and shorter. The duration of the gate drive signal refers to duration of an effective potential for enabling a pixel P1 to emit light. When the duration of the effective potential of the gate drive signal is shorter, it is more impossible for the pixel P1 that receives the gate drive signal to be fully turned on, which refers to a degree of switch-on of a transistor configured to directly receive the gate drive signal in the pixel P1. Thus, a data signal cannot be effectively written into the pixel P1, that is, the weaker the data signal received by the pixel P1, the higher the brightness (that is, light emission brightness) of the pixel P1. In contrast, the longer the duration of the effective potential of the gate drive signal, the lower the brightness of the pixel P1. In this case, in a current design of a single-side drive mode in the related art, there is a gradation in brightness of the pixels P1 in every row of pixels 031 that gets brighter and brighter in a direction from the end near the first GOA unit 021 to the end far away from the first GOA unit 021. The gradation in the brightness results in a macro display defect (mura) of the display panel, and the display of the display panel is abnormal.

In embodiments of the present disclosure, by providing the plurality of first GOA units 021 distributed on the two sides of the substrate 01 in the row extension direction X1, it is possible to make the brightness of individual pixels included in each row of pixels in a part of the plurality of rows of pixels to gradually increase and the brightness of individual pixels included in each row of pixels in the other part of the plurality of rows of pixels to gradually decrease along a direction from one side to the other side of the two sides. Further, a macro display mura problem caused by the signal line loading is visually eliminated, thereby ensuring that the display panel has a good display effect.

In addition, in embodiments of the present disclosure, in the at least one row of pixels 031 included in at least one pixel group 03, part of the pixels P1 are coupled to one of the two gate lines G1 coupled to the at least one pixel group 03, other pixels P1 expect the part of the pixels P1 are coupled to the other one of the two gate lines G1 coupled to the at least one pixel group 03, and the first GOA unit 021 coupled to one gate line G1 and the first GOA unit 021 coupled to the other gate line G1 are disposed on different sides. That is, for the two first GOA units 021 disposed on different sides, in at least one row of pixels 031 coupled to the two first GOA units 021 disposed on different sides by the two gate lines G1, a part of the pixels P1 are coupled to the gate line G1 coupled to one first GOA unit 021, and the other part of the pixels P1 are coupled to the gate line G1 coupled to the other first GOA unit 021. For example, referring to FIG. 3, in at least one pixel group 03 shown in the figure, part of the pixels P1 included in every row of pixels 031 are coupled to one of the two gate lines G1 coupled to the at least one pixel group 03, and other pixels P1 expect the part of the pixels P1 are coupled to the other one of the two gate lines G1 coupled to the at least one pixel group 03.

In the related art, all the pixels P1 in every row of pixels 031 included in the display panel are usually coupled to the same first GOA unit 021 by the same gate line G1. Research shows that, in combination with the foregoing reason that the signal line loading affects the brightness of every row of pixels P1, based on the arrangement that the plurality of first GOA units 021 are distributed on the two sides of the substrate 01 in the row extension direction X1, the coupling manner in the direction from one side to the other side of the two sides in the related art leads to that: in the two rows of pixels 031 included in the at least one pixel group 03, the loading on the gate line G1 coupled to one row of pixels 031 keeps increasing (referred to as a row with the maximum loading), and there is a gradation in the brightness of the pixels P1 in the one row of pixels 031 that gets darker and darker; and the loading on the gate line G1 coupled to the other row of pixels 031 keeps decreasing (referred to as a row with the minimum loading), and there is a gradation in the brightness of the pixels P1 in the other row of pixels 031 that is brighter and brighter. That is, the two rows of pixels 031 are different in brightness, and the display effect is still affected.

In embodiments of the present disclosure, by setting the two rows of pixels 031 included in at least one pixel group 03 in the display panel to be coupled to the two gate lines G1 in the manner shown in FIG. 1 instead of being coupled in a one-to-one correspondence, the impact from the loading on the gate line G1 on the light emission brightness of every row of pixels P1 can be minimized, so that for every row of pixels 031, the trend that the brightness gradually increases because of the gradually increasing loading can be reliably eliminated, or the trend that the brightness gradually decreases because of the gradually decreasing loading can be reliably eliminated, so as to eliminate or minimize a brightness difference between the two rows of pixels 031, thereby further improving the display effect of the display panel.

In summary, embodiments of the present disclosure provide a display panel. The display panel includes a substrate including a display region and a GOA region, a plurality of rows and a plurality of columns of pixels disposed in the display region, and a first GOA circuit disposed in the GOA region. A plurality of first GOA units included in the first GOA circuit are coupled to a plurality of rows of pixels by a plurality of gate lines, and are configured to transmit gate drive signals to the plurality of rows of pixels, to drive the plurality of rows of pixels to emit light. By providing the plurality of first GOA units distributed on two sides of the substrate, it is possible to make the brightness of individual pixels included in each row of pixels in part of the plurality of rows of pixels to keep increasing, and the brightness of individual pixels included in each row of pixels in the other part of rows of pixels to keep decreasing in a direction from one side to the other side of the two sides, to solve the problem of macro display mura and ensure that the display panel has a good display effect.

In addition, in two rows of pixels coupled to two first GOA units disposed on different sides by two gate lines, part of the pixels in at least one row of pixels are coupled to one of the two gate lines, and other pixels are coupled to the other one of the two gate lines, and it is possible to make brightness change trend of the at least one row of pixels to be as consistent as possible, that is, the brightness difference is small or there is no brightness difference, thereby further ensuring a good display effect of the display panel.

Figure 2:
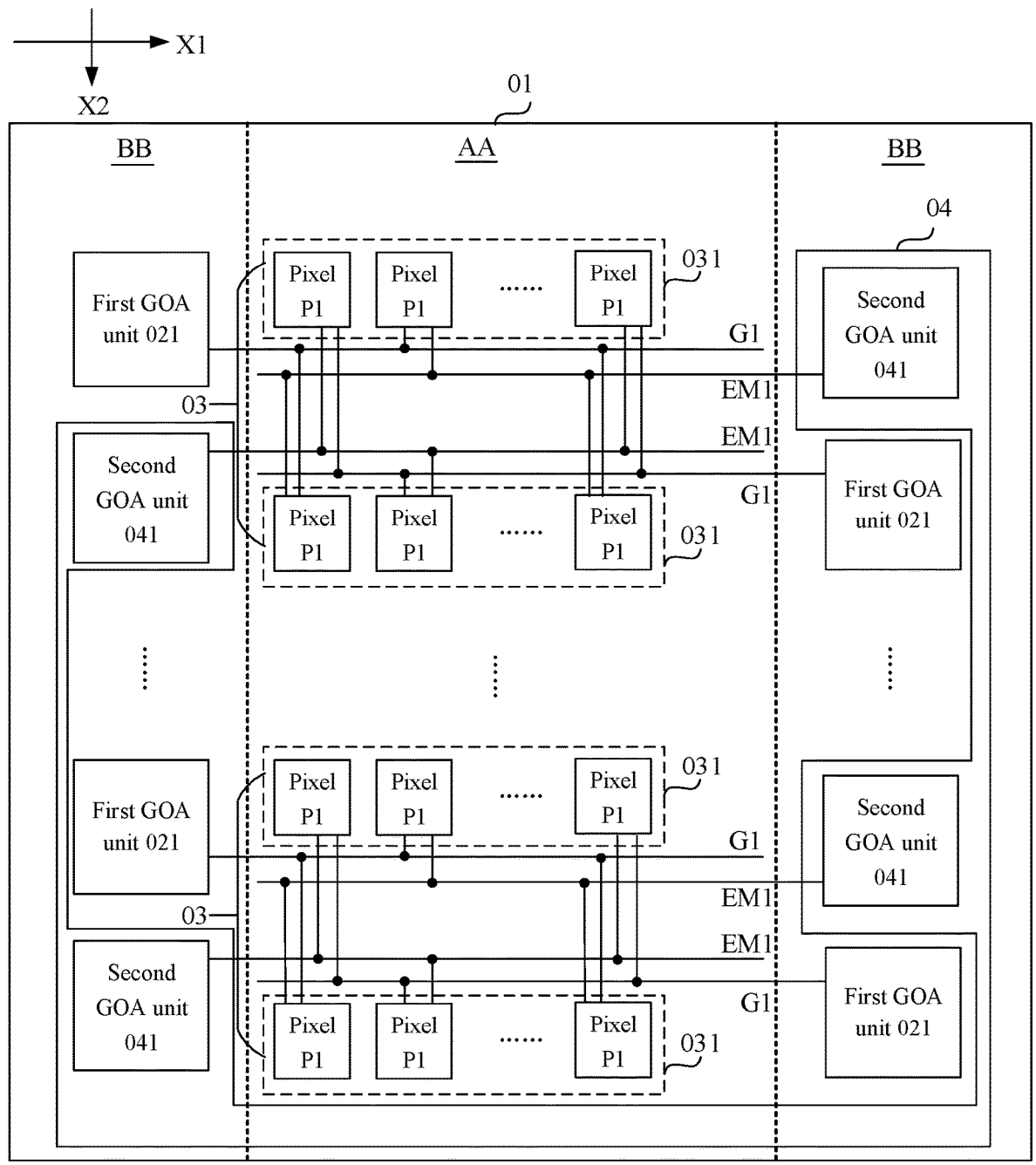
FIG. 2 is a schematic structural diagram of another display panel according to an embodiment of the present disclosure.

FIG. 2 is a schematic structural diagram of another display panel according to an embodiment of the present disclosure. As shown in FIG. 2, the display panel recorded in this embodiment of the present disclosure may further include a plurality of light emission (EM) control lines EM1. The plurality of light emission control lines EM1 may be disposed in the display region AA and the GOA region BB. Similar to the plurality of gate lines G1, for each light emission control line EM1, one part may be disposed in the display region AA, and the other part may be disposed in the GOA region BB. The length of the one part is usually far larger than the length of the other part. In addition, each light emission control line EM1 may extend in the row extension direction X1, and a plurality of light emission control lines EM1 may be arranged in the column extension direction X2.

Continuing to refer to FIG. 2, the display panel may further include a second GOA circuit (that is, a second GOA circuit 04) disposed in the GOA region BB. The second GOA circuit 04 may include a plurality of cascaded second shift register units, that is, second GOA units 041. The plurality of second GOA units 041 may be coupled to the plurality of light emission control lines EM1, and are configured to transmit light emission control signals to the plurality of light emission control lines EM1. Correspondingly, the second GOA circuit 04 may also be referred to as a light emission control circuit, that is, an EM GOA circuit. The second GOA unit 041 may also be referred to as an EM GOA unit.

Similar to the first GOA circuit 02, the plurality of cascaded second GOA units 041 may refer to that every two (which may also be referred to as two stages) second GOA units 041 are coupled to each other, and a latter second GOA unit 041 is driven by a former second GOA unit 041 to operate. In addition, the two second GOA units 041 coupled to each other here may be adjacent as shown in FIG. 2, or may be not adjacent. Moreover, the plurality of cascaded second GOA units 041 may further be coupled to a start signal terminal by one second GOA unit 041, and are configured to transmit light emission control signals to the plurality of light emission control lines EM1 based on a start signal transmitted by the start signal terminal. With reference to FIG. 2, to facilitate wiring, the second GOA unit 041 coupled to the start signal terminal may be a first "second GOA unit 041" in the column extension direction X2, which may also be referred to as a first-stage second GOA unit 041. Next, a second-stage second GOA unit 041 is coupled to the first-stage second GOA unit 041, a third-stage second GOA unit 041 is coupled to the second-stage second GOA unit 041, and so on.

Similar to a coupling manner of the plurality of first GOA units 021 to the plurality of gate lines G1, the plurality of second GOA units 041 and the plurality of light emission control lines EM1 may also be coupled in a one-to-one correspondence. That is, every second GOA unit 041 is coupled to one light emission control lines EM1, and the second GOA units 041 are coupled to different light emission control lines EM1. As can be seen, a quantity of the second GOA units 041 included in the second GOA circuit 04 may be greater than or equal to a quantity of the plurality of light emission control lines EM1. It needs to be noted that, the plurality of second GOA units 041 and the plurality of first GOA units 021 may be coupled to different start signal terminals.

Based on that the second GOA circuit 04 is included, as can be seen by continuing to refer to FIG. 2, the two rows of pixels 031 included in the at least one pixel group 03 may be further coupled to two light emission control lines EM1 of the plurality of light emission control lines EM, and the two rows of pixels 031 may be configured to emit light based on light emission control signals on the two light emission control lines EM1 and the gate drive signals on the two coupled gate lines G1.

Similar to a coupling manner between the pixels and the gate lines, the two rows of pixels 031 included in each pixel group 03 may be coupled to two different light emission control lines EM1 of the plurality of light emission control lines EM1. As can be seen, the quantity of the plurality of light emission control lines EM1 may also be greater than or equal to a quantity of rows of pixels P1 included in the display panel. This embodiment of the present disclosure is described by using an example in which the quantity of the second GOA units 041 included in the second GOA circuit 04 is equal to the quantity of the plurality of light emission control lines EM1 and is equal to the quantity of rows of pixels P1. In this case, it may be considered that the plurality of second GOA units 041 are coupled to a plurality of rows of pixels 031 by the plurality of light emission control lines EM1, and the plurality of second GOA units 041 are configured to transmit (for example, transmit row by row) light emission control signals to the plurality of rows of pixels 031 through the plurality of light emission control lines EM1, to drive the plurality of rows of pixels 031 to emit light.

As can be seen by continuing to refer to FIG. 2, similar to the plurality of first GOA units 021, in the plurality of second GOA units 041, in the row extension direction X1, part of the second GOA units 041 may be disposed on one side, and other second GOA units 041 are disposed on the other side, that is, the plurality of second GOA units 041 may be distributed on two sides of the substrate 01 in the row extension direction X1 instead of being all disposed on the same side of the substrate 01. With reference to FIG. 2, the "two sides" here may also refer to a left side and a right side. When a part of the second GOA units 041 are disposed on the left side, the other second GOA units 041 may be correspondingly disposed on the right side. When a part of the second GOA units 041 are disposed on the right side, the other second GOA units 041 may be correspondingly disposed on the left side.

An arrangement direction of the light emission control lines EM1 is the same as an arrangement direction of the gate lines G1. Therefore, similar to the gate lines G1, there is also loading on the light emission control lines EM1. If the plurality of second GOA units 041 are all arranged on the same side of the substrate 01, a macro display mura problem is also caused. Therefore, by providing the plurality of second GOA units 041 distributed on the two sides of the substrate 01, a macro display mura problem can also be effectively improved, and a good display effect of the display panel is further ensured. For the principle of improving the macro display mura problem here, reference may be made to the records in the foregoing embodiments. Details are not described here.

In addition, based on that the second GOA circuit 04 is included, as can be seen by continuing to refer to FIG. 2, in at least one row of pixels 031 included in the at least one pixel group 03, a part of the pixels P1 may be coupled to one of the two light emission control lines EM1 coupled to the at least one pixel group 03, and other pixels P1 expect the part of the pixels P1 may be coupled to the other one of the two light emission control lines EM1 coupled to the at least one pixel group 03. That is, for two second GOA units 041 disposed on different sides, in two rows of pixels 031 coupled to the two light emission control lines EM1, a part of the pixels P1 in the at least one row of pixels 031 are coupled to the light emission control lines EM1 coupled to one second GOA unit 041, and the other part of the pixels P1 are coupled to the light emission control lines EM1 coupled to the other second GOA unit 041.

For example, referring to FIG. 2, in at least one pixel group 03 shown in the figure, a part of the pixels P1 included in every row of pixels 031 are coupled to one of the light emission control lines EM1 coupled to the at least one pixel group 03, and other pixels P1 expect the part of the pixels P1 are coupled to the other one of the two light emission control lines EM1 coupled to the at least one pixel group 03. In this case, compared with the related technology in which the two rows of pixels 031 and the two light emission control lines EM1 are coupled in a one-to-one correspondence, the loading on the two light emission control lines EM1 coupled to the two rows of pixels 031 may also be made as consistent as possible, so that the brightness between the two rows of pixels 031 is made as indistinguishable as possible, thereby improving a display effect. For the improving principle here, reference may also be made to the records in the foregoing embodiment, and details are not described here.

Optionally, as can be seen from FIG. 1 and FIG. 2, in embodiments of the present disclosure, in the plurality of pixel groups 03, every pixel group 03 includes two rows of pixels 031. For every pixel group 03, in the two rows of pixels 031 included in the pixel group 03, part of the pixels P1 in every row of pixels 031 are all coupled to one of the two gate lines G1 coupled to the pixel group 03, other pixels P1 expect the part of the pixels P1 are all coupled to the other one of the two gate lines G1 coupled to the pixel group 03, and the first GOA unit 021 coupled to one gate line G1 and the first GOA unit 021 coupled to the other gate line G1 are disposed on different sides. In other words, two first GOA units coupled to two rows of pixels 031 in every pixel group 03 by the two gate lines G1 are disposed on different sides. A coupling manner of the light emission control lines EM1 and the second GOA unit 041 may be similar, and details are not described here.

Optionally, as still can be seen from FIG. 1 and FIG. 2, two rows of pixels 031 included in at least one pixel group 03 may be disposed in adjacent rows. In this case, wiring can be facilitated, and wiring costs are reduced. For example, two rows of pixels 031 included in every pixel group 03 shown in the figure are disposed in adjacent rows.

Optionally, in embodiments of the present disclosure, at least one row of pixels 031 recorded in the foregoing embodiment may include an even number of pixels P1. A quantity of pixels included in the part of the pixels P1 and a quantity of pixels included in the other pixels P1 are the same, and are both equal to one half of a total quantity of the pixels P1 included in the at least one row of pixels 031. That is, in the at least one row of pixels 031, one half of the pixels P1 may be coupled to one of the two gate lines G1, and the other half of the pixels P1 may be coupled to the other one of the two gate lines G1. For example, in every pixel group 03 shown in the figure, every row of pixels 031 includes an even number of pixels P1, and a quantity of pixels included in part of the pixels P1 and a quantity of pixels included in other pixels P1 are the same, and are both equal to one half of the total quantity of the pixels P1 included in the row of pixels 031.

For example, assuming that the display panel includes 1000 rows of pixels 031, that is, n is 1000, in at least one row of pixels 031 included in the at least one pixel group 03, 500 pixels P1 may be coupled to one of the two gate lines G1, and other 500 pixels P1 expect the 500 pixels may be coupled to the other one of the two gate lines G1. In this way, the pixels P1 in the at least one row of pixels 031 may further have a small brightness difference, thereby further improving the display effect.

Optionally, as still can be seen from FIG. 1 and FIG. 2, in the at least one row of pixels 031 included in the at least one pixel group 03, two adjacent pixels P1 may be coupled to different gate lines G1. That is, in every two adjacent pixels P1, one pixel P1 is coupled to one of the two gate lines G1, and the other pixel P1 is coupled to the other one of the two gate lines G1. In this case, the display effect can be further improved. For example, in every row of pixels 031 included in every pixel group 03 shown in the figure, every two adjacent pixels P1 are coupled to different gate lines G1.

Optionally, as can be seen by continuing to refer to FIG. 2, in embodiments of the present disclosure, the first GOA units 021 coupled to every row of pixels 031 by the gate line G1 and the second GOA units 041 coupled to the every row of pixels 031 by the light emission control lines EM1 are disposed on different sides. This will facilitate a narrow bezel design of the display device and provide a solid foundation to a full screen display design of the display device.

Figure 3:
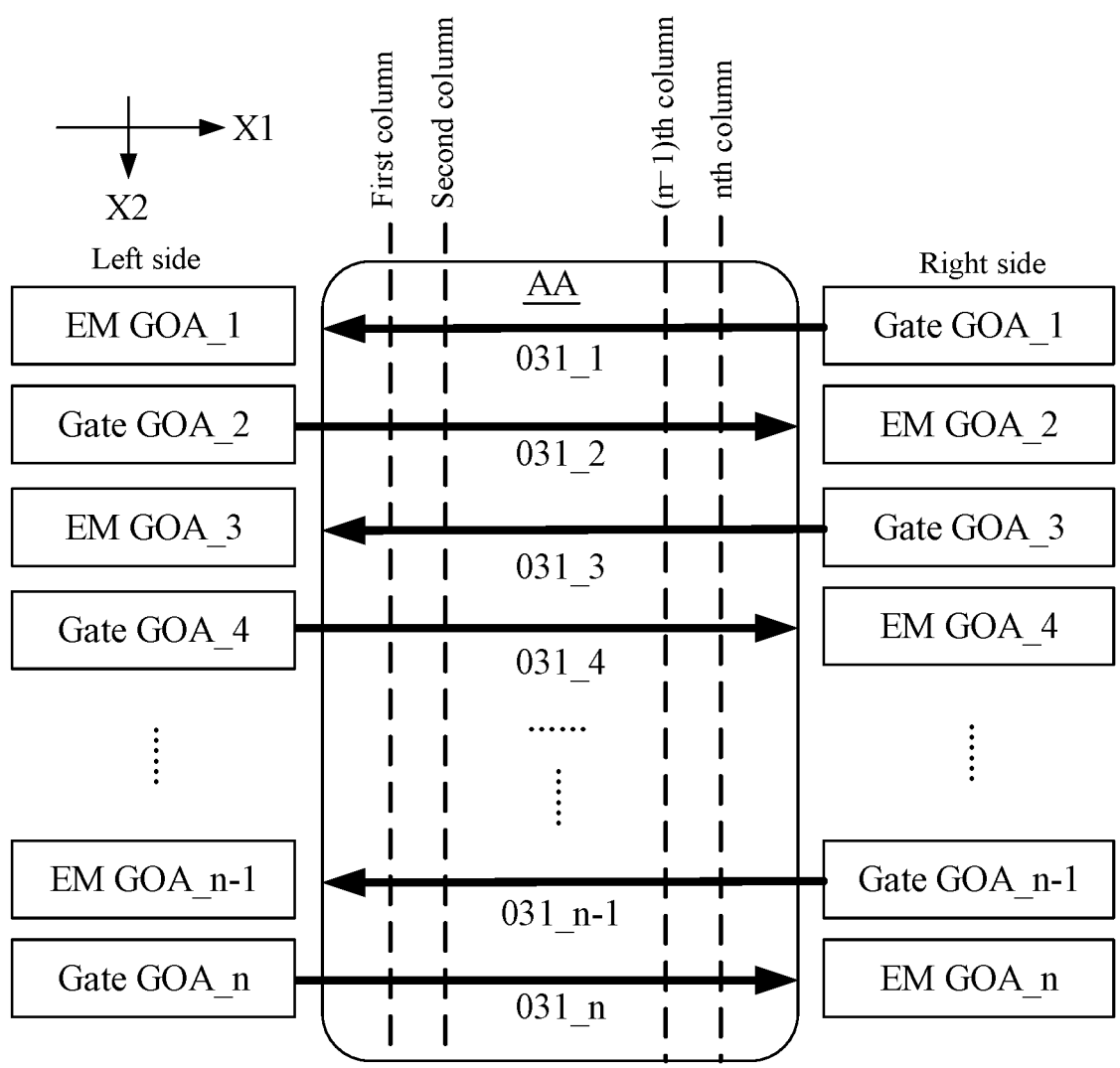
FIG. 3 is a schematic structural diagram of still another display panel according to an embodiment of the present disclosure.

For example, as can be seen from FIG. 2 and FIG. 3, in the plurality of first GOA units 021, the first GOA units 021 coupled to even-numbered rows of pixels by the gate line G1 may all be disposed on one side. The first GOA units 021 coupled to odd-numbered rows of pixels by the gate line G1 may all be disposed on the other side. Correspondingly, in the plurality of second GOA units 041, the second GOA units 041 coupled to the even-numbered rows of pixels by the light emission control lines EM1 may all be disposed on the one side. The second GOA units 041 coupled to the odd-numbered rows of pixels by the light emission control lines EM1 may all be disposed on the other side.

That is, the first GOA units 021 coupled to the odd-numbered rows of pixels and the first GOA units 021 coupled to the even-numbered rows of pixels are alternately arranged on two sides in the row extension direction X1 in an S-shaped arrangement mode. The second GOA units 041 coupled to the odd-numbered rows of pixels and the second GOA units 041 coupled to the even-numbered rows of pixels are alternately arranged on two sides in the row extension direction X1 in an S-shaped arrangement mode. In addition, the first GOA units 021 coupled to the odd-numbered rows of pixels and the second GOA units 041 coupled to the even-numbered rows of pixels are disposed on the same side; and the first GOA units 021 coupled to the even-numbered rows of pixels and the second GOA units 041 coupled to the odd-numbered rows of pixels are disposed on the same side.

In addition, based on the alternate arrangement mode, the first GOA units 021 and the second GOA units 041 disposed on one side (that is, the left side) may be sequentially arranged in the column extension direction X2 in an order of one second GOA unit 041 and one first GOA unit 021. The first GOA units 021 and the second GOA units 041 disposed on the other side (that is, the right side) may be sequentially arranged in the column extension direction X2 in an order of one first GOA unit 021 and one second GOA unit 041. That is, referring to FIG. 3, for example, the display panel includes a total of n rows of pixels 031 and n is even quantity. The second GOA units 041 coupled to the first row of pixels 031_1, the third row of pixels 031_3, the fifth row of pixels 031_5, . . . , and the $(n-1)^{th}$ row of pixels 031_$n$-1 may all be disposed on the left side of the display region AA. The first GOA units 021 coupled to the first row of pixels 031_1, the third row of pixels 031_3, the fifth row of pixels 031_5, . . . , and the $(n-1)^{th}$ row of pixels 031_$n$-1 may all be disposed on the right side of the display region AA. The second GOA units 041 coupled to the second row of pixels 031_2, the fourth row of pixels 031_4, the sixth row of pixels 031_6, . . . , and the $n^{th}$ row of pixels 031_$n$ may all be disposed on the right side of the display region AA. The first GOA units 021 coupled to the second row of pixels 031_2, the fourth row of pixels 031_4, the sixth row of pixels 031_6, . . . , and the $n^{th}$ row of pixels 031_$n$ may all be disposed on the left side of the display region AA.

It needs to be noted that, FIG. 3 does not specifically show the pixels P1 in every row of pixels 031, and are only replaced with the gate line G1. In addition, to distinguish between different first GOA units 021 and second GOA units 041, in FIG. 3, "gate GOA_1, gate GOA_2, gate GOA_3, gate GOA_4, gate GOA_5, gate GOA_6, gate GOA_n−1, and gate GOA_n" are used to respectively represent the first GOA units 021 coupled to corresponding rows of pixels. "EM GOA_1, EM GOA_2, EM GOA_3, EM GOA_4, EM GOA_5, EM GOA_6, EM GOA_n−1, and EM GOA_n" are used to respectively represent the second GOA units 041 coupled to corresponding rows of pixels. In addition, FIG. 3 further schematically shows that the display panel includes n columns of pixels.

Certainly, in some embodiments, the first GOA units 021 and the second GOA units 041 disposed on the left side may be sequentially arranged in the column extension direction X2 in an order of one first GOA unit 021 and one second GOA unit 041. The first GOA units 021 and the second GOA units 041 disposed on the right side may be sequentially arranged in the column extension direction X2 in an order of one second GOA unit 041 and one first GOA unit 021.

For the coupling manner in FIG. 3, every one odd-numbered row of pixels and one even-numbered row of pixels that are adjacent may be classified into the at least one pixel group 03 of the plurality of pixel groups 03 recorded in the foregoing embodiments.

In addition, based on the coupling manner in FIG. 3, in a case that the plurality of rows of pixels 031 and the plurality of gate lines G1 in the display panel are coupled in a one-to-one correspondence, as can be seen from the foregoing introduction about the problem caused by to the signal line loading, for the structure shown in FIG. 3, the loading on the first gate line G1 coupled to the first row of pixels 031_1 gradually increases from the right side to the left side, the loading on the second gate line G1 coupled to the second row of pixels 031_2 gradually increases from the left side to the right side. The third row to the nu row are similar. Finally, as a result, the loading on the gate lines G1 coupled to all the odd-numbered rows of pixels is maximum on the left side and minimum on the right side. The loading on the gate lines G1 coupled to all the even-numbered rows of pixels are minimum on the left side and maximum on the right side. Further, as a result, for the odd-numbered rows of pixels of the display panel, the brightness on the left side is higher than the brightness on the right side, and for the even-numbered rows of pixels of the display panel, the brightness on the left side is lower than the brightness on the right side. That is, the odd-numbered rows of pixels and the even-numbered rows of pixels of the display panel have different brightness, and all odd-numbered rows of pixels and all even-numbered rows of pixels are respectively rows with maximum gate loading and rows with minimum gate loading.

Because when the display panel displays a 1W1B picture, only all the odd-numbered rows of pixels emit light, and none of the even-numbered rows of pixels emits light. When the display panel displays a 1B1W picture, only all the even-numbered rows of pixels emit light, and none of the odd-numbered rows of pixels emit s light. As a result, the foregoing brightness difference phenomenon is intensified, causing a poor display effect. The display of the 1W1B picture refers to that the display panel displays in turn white in one row and black in one row starting from the first row, and it may also be understood as that a white picture is displayed in odd-numbered rows and display is not performed in even-numbered rows. Similarly, the display of a 1B1W picture refers to that the display panel sequentially displays black in one row and white in one row starting from the first row, and it may also be understood as that display is not performed in odd-numbered rows and a white picture is displayed in even-numbered rows.

For the structure shown in FIG. 3, in every one odd-numbered row of pixels and one even-numbered row of pixels which are adjacent in embodiments of the present disclosure, every row of pixels 031 are all respectively coupled to the two gate lines G1, so that duration of gate drive signals transmitted to pixels P1 in different rows and the same column may be as consistent as possible, thereby reducing a brightness difference between the odd-numbered rows of pixels and the even-numbered rows of pixels.

Figure 4:
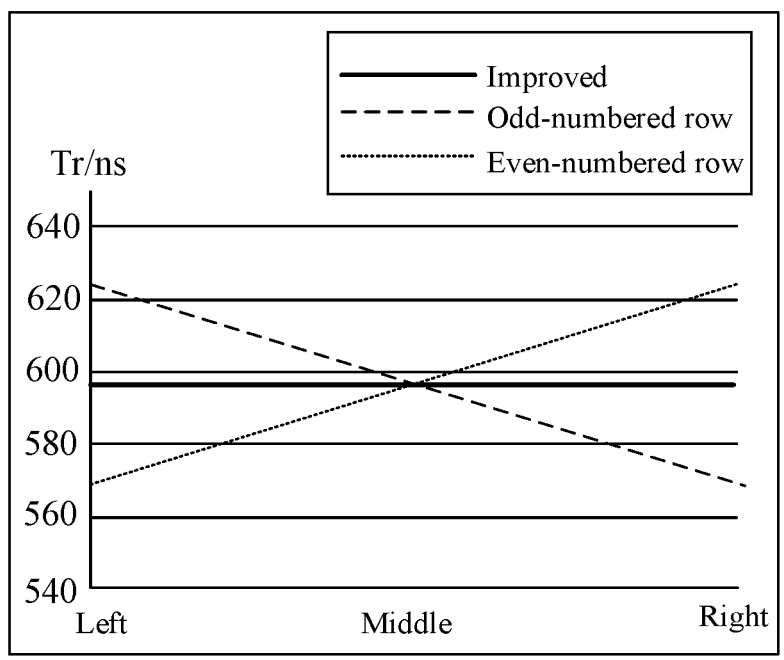
FIG. 4 is a diagram of a test result of improved display effect according to an embodiment of the present disclosure.

For example, the structure shown in FIG. 3 is used, and every two adjacent pixels P1 included in every row of pixels 031 are alternately coupled to the two gate lines G1. FIG. 4 shows a schematic diagram of a test result. A horizontal coordinate represents arrangement positions of pixels in the display panel in the row extension direction X1, and includes three parts: a left side, a middle and a right side. A vertical coordinate represents duration Tr of a gate drive signal in nanoseconds (ns). As can be seen from the records in the foregoing embodiments, the duration of the gate drive signal may be used for representing light emission brightness of pixels, and the longer the duration, the brighter the brightness. In contrast, the shorted the duration, the darker the brightness. As can be seen from with reference to FIG. 4, in the use of the coupling solution in the related art, from the left side to the right side of the display panel, the brightness of odd-numbered rows of pixels gradually decreases, the brightness of even-numbered rows of pixels gradually increases, and there is a large brightness difference. In the use of the coupling solution provided in the embodiments of the present disclosure, from the left side to the right side of the display panel, the brightness uniformity of the odd-numbered rows of pixels and the even-numbered rows of pixels is better.

Optionally, the at least one row of pixels 031 in the at least one pixel group 03 recorded in the foregoing embodiments may include a plurality of pixels of different colors P1. In addition, in the plurality of pixels P1 of different colors, part of a plurality of pixels P1 of at least one color are coupled to the one of the two gate lines G1 coupled to the at least one pixel group 03, and other pixels P1 expect the part of the pixels P1 are coupled to the other one of the two gate lines G1 coupled to the at least one pixel group 03.

Figure 5:
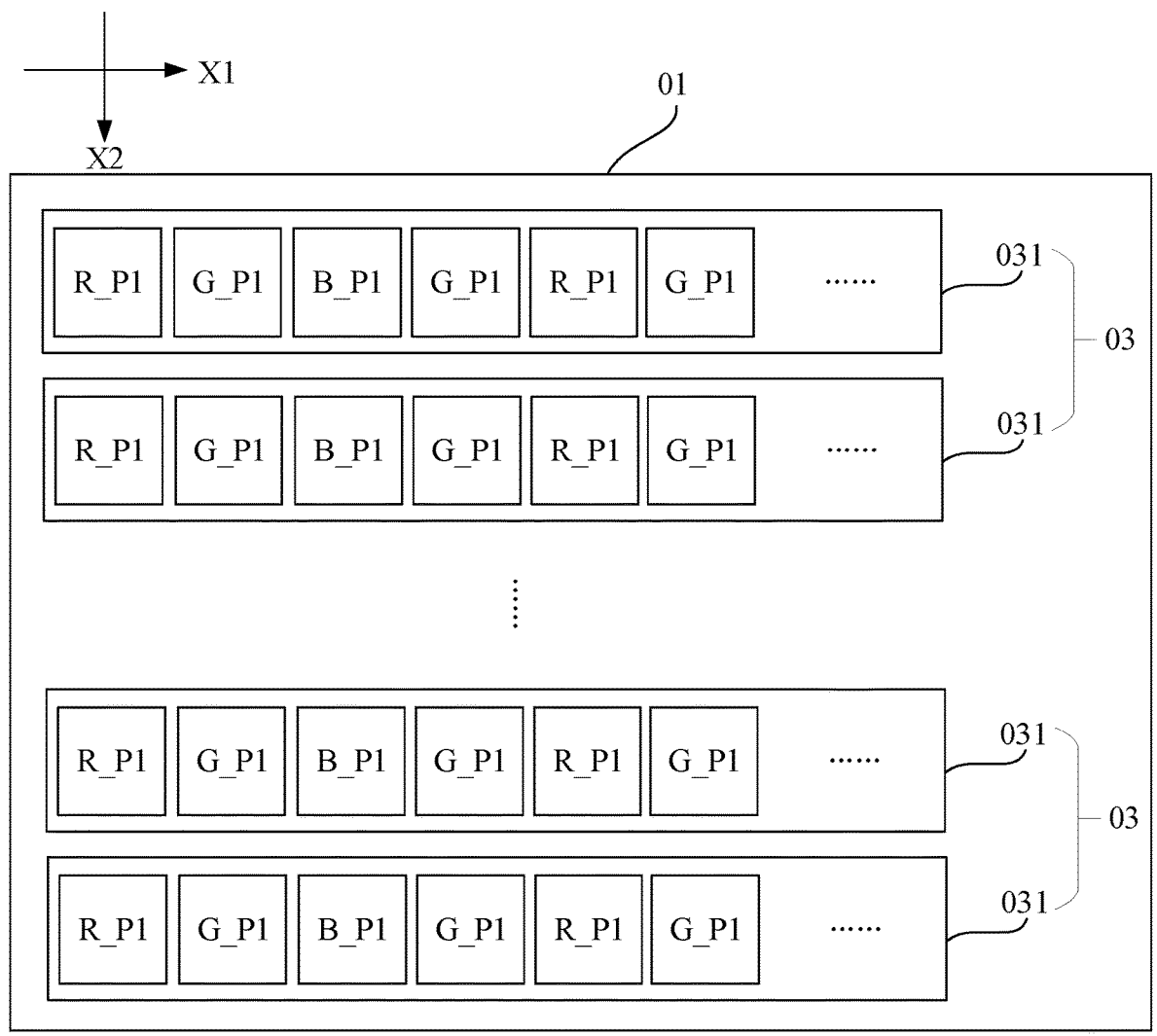
FIG. 5 is a schematic structural diagram of yet another display panel according to an embodiment of the present disclosure.

For example, referring to FIG. 5, every row of pixels 031 in the at least one pixel group 03 shown in the figure includes a plurality of red (R) pixels R_P1, a plurality of green (G) pixels G_P1, and a plurality of blue (B) pixels B_P1. At least one color may be green G. That is, in every row of pixels 031 included in the at least one pixel group 03, in a plurality of green (G) pixels G_P1 that are preferentially arranged, part of the pixels G_P1 are coupled to one gate line G1, and other pixels G_P1 are coupled to the other gate line G1.

Optionally, for every row of pixels 031, in the row extension direction X1, the plurality of red pixels R_P1, the plurality of green pixels G_P1, and the plurality of blue pixels B_P1 may be sequentially arranged according to an order of one red pixel R_P1, one green pixel G_P1, one blue pixel B_P1, and one green pixel G_P1. Certainly, in some embodiments, another arrangement mode may also be satisfied. For example, the pixels are sequentially arranged according to an order of one red pixel R_P1, one green pixel G_P1, and one blue pixel B_P1. This is not limited in embodiments of the present disclosure.

It needs to be noted that, because the light emission efficiency of a light-emitting material of the green G pixels G_P1 is higher than the light emission efficiency of a light-emitting material of the pixels P1 of other color (for example, red R and/or blue B), and contributes more to brightness. Therefore, green G pixels G_P1 are preferentially adjusted to satisfy the foregoing coupling manner, which can further ensure the effective improvement to the display effect. In all the following embodiments, the at least one color being green is used as an example, that is, improving the coupling manner between the green pixels G_P1 and the gate line G1 is used for description.

Figure 6:
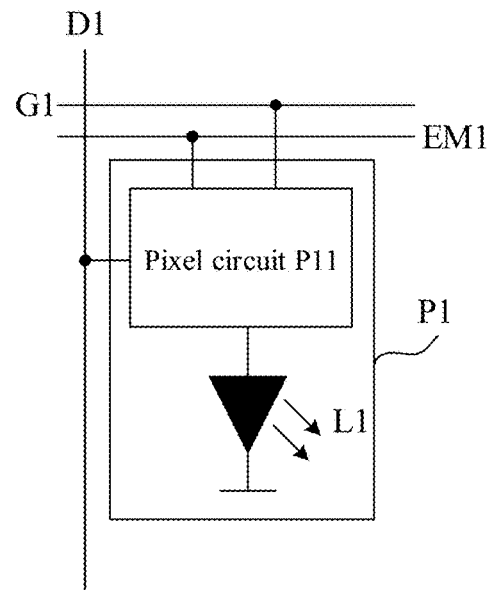
FIG. 6 is a schematic structural diagram of a pixel according to an embodiment of the present disclosure.

Optionally, FIG. 6 is a schematic structural diagram of a pixel according to an embodiment of the present disclosure. As shown in FIG. 6, the pixel P1 in the display panel may include a pixel circuit P11 and a light-emitting element L1.

The pixel circuit P11 may be respectively coupled to the gate line G1 and the light-emitting element L1. The pixel circuit P11 may be configured to transmit a light emission drive signal (for example, a drive current) to the light-emitting element L1 in response to a gate drive signal on the gate line G1, to drive the light-emitting element L1 to emit light. That is, the first GOA units 021 may be coupled to the pixel circuit P11 in the pixel P1 by the gate line G1, to transmit the gate drive signal to the pixel circuit P11, thereby controlling the pixel circuit P11 to turn on the light-emitting element L1.

It needs to be noted that, when the light-emitting element L1 is an OLED, the light-emitting element L1 usually includes an anode and a cathode. The pixel circuit P11 may usually be coupled to the anode of the light-emitting element L1, and the cathode of the light-emitting element L1 may be coupled to a power terminal. The light-emitting element L1 may emit light under the action of a voltage difference between the light emission drive signal and a power signal provided by the power terminal.

Moreover, as further can be seen from FIG. 6, the pixel circuit P11 may further be coupled to the light emission control lines EM1 and the data line D1. That is, the second GOA unit 041 may be coupled to the pixel circuit P11 in the pixel P1 by the light emission control lines EM1, to transmit a light emission control signal to the pixel circuit P11. The pixel circuit P11 may jointly drive the light-emitting element L1 to emit light, based on the gate drive signal provided by the gate line G1, the light emission control signal provided by the light emission control lines EM1, and the data signal provided by the data line D1. Certainly, the pixel circuit P11 may be further coupled to another signal line (for example, a reset signal line).

Optionally, in the display panel, the pixel circuits P11 included in the pixels P1 may have the same structure, for example, may all have a 7T1C (including seven transistors and one capacitor) structure.

The seven transistors may at least include a data write transistor, a compensation transistor, and a light emission control transistor. The data write transistor and the compensation transistor may be both configured to receive the gate drive signal. The light emission control transistor may be configured to receive the light emission control signal. In addition, the data write transistor may be further configured to receive the data signal. The seven transistors may transmit the light emission drive signal (for example, the drive current) to the light-emitting element to drive the light-emitting element L1 to emit light based on the received signal.

Figure 7:
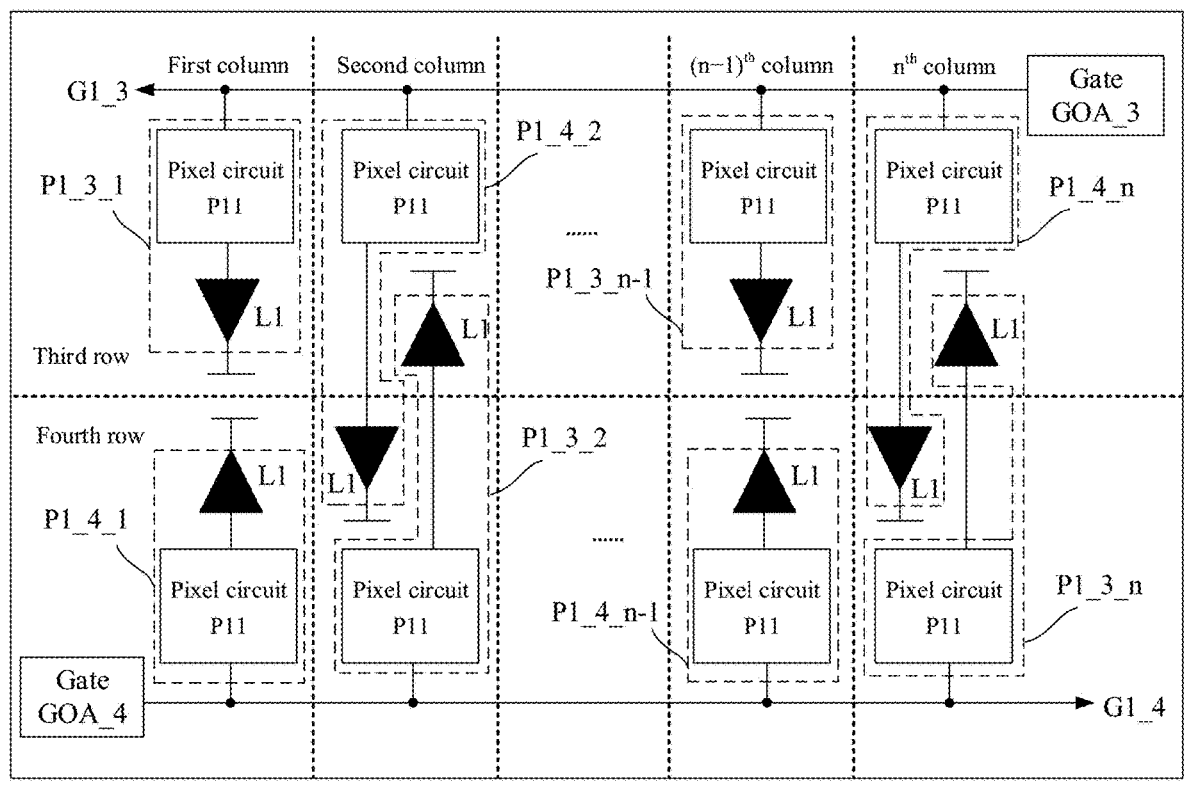
FIG. 7 is a schematic diagram of a coupling manner of part of pixels in a display panel according to an embodiment of the present disclosure.

As an optional embodiment, referring to the display panel shown in FIG. 7, in every row of pixels 031 included in at least one pixel group 03 recorded in embodiments of the present disclosure, the light-emitting element L1 included in each pixel P1 of part of the pixels P1 and the light-emitting element L1 included in each pixel P1 of other pixels P1 may be disposed in the same row. The pixel circuit P11 included in each pixel P1 of the part of the pixels P1 and the light-emitting element L1 may be disposed in different rows. The pixel circuit P11 included in each pixel P1 of the other pixels P1 and the light-emitting element L1 may be disposed in the same row. That is, the pixel circuit P11 and the light-emitting element L1 may be arranged in a staggered manner, to achieve the objective that the part of the pixels P1 and the other pixels P1 are all respectively coupled to the two gate lines G1.

For example, FIG. 7 only schematically shows one pixel group 03. The pixel group 03 includes the third row of pixels and the fourth row of pixels that are adjacent, and every row of pixels includes n columns of pixels. The first GOA units 021 coupled to the third gate line G1_3 is marked as "gate GOA_3". The first GOA units 021 coupled to the fourth gate line G1_4 is marked as "gate GOA_4".

As can be seen from FIG. 7, in the pixel P1_3_1 in the third row and the first column and the pixel P1_3_$n$-1 in the third row and the $(n-1)^{th}$ column, the pixel circuits P11 and the light-emitting elements L1 are both disposed in the same third row, and the pixel circuits P11 are coupled to the third gate line G1_3. In the pixel P1_3_2 in the third row and the second column and the pixel P1_3_$n$ in the third row and the $n^{th}$ column, the pixel circuits P11 and the light-emitting elements L1 are disposed in different rows, the pixel circuits P11 are disposed in the fourth row and are coupled to the fourth gate line G1_4, and the light-emitting elements L1 are disposed in the third row. In this case, for the third row of pixels, the pixel P1_3_1 disposed in the first column and the pixel P1_3_$n$-1 disposed in the $(n-1)^{th}$ column may be classified into the other pixels P1, and the pixel P1_3_2 disposed in the second column and the pixel P1_3_$n$ disposed in the $n^{th}$ column may be classified into the part of the pixels P1. In the pixel P1_4_1 in the fourth row and the first column and the pixel P1_4_$n$-1 in the fourth row and the $(n-1)^{th}$ column, the pixel circuits P11 and the light-emitting elements L1 are all disposed in the same fourth row, and the pixel circuits P11 are coupled to the fourth gate line G1_4. In the pixel P1_4_2 in the fourth row and the second column and the pixel P1_4_$n$ in the fourth row and the $n^{th}$ column, the pixel circuits P11 and the light-emitting elements L1 are disposed in different rows, the pixel circuits P11 are disposed in the third row and are coupled to the third gate line G1_3, and the light-emitting elements L1 are disposed in fourth row. In this case, for the fourth row of pixels, the pixel P1_4_1 disposed in the first column and the pixel P1_4_$n$-1 disposed in the $(n-1)^{th}$ column may be classified into the other pixels P1, and the pixel P1_4_2 disposed in the second column and the pixel P1_4_$n$ disposed in the $n^{th}$ column may be classified into the part of the pixels P1.

Figure 8:
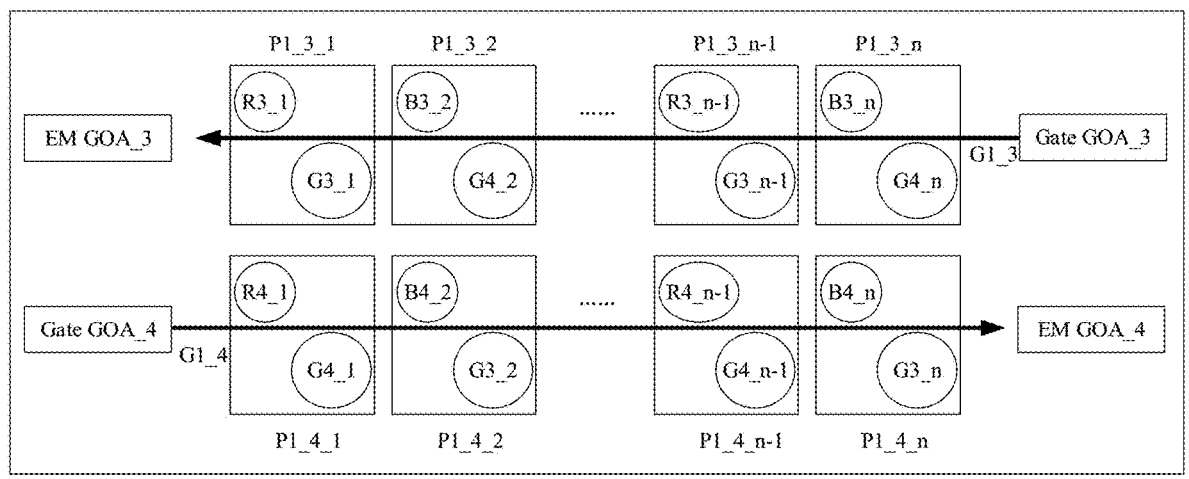
FIG. 8 is a schematic diagram of a coupling manner of part of pixels in another display panel according to an embodiment of the present disclosure.
Figure 9:
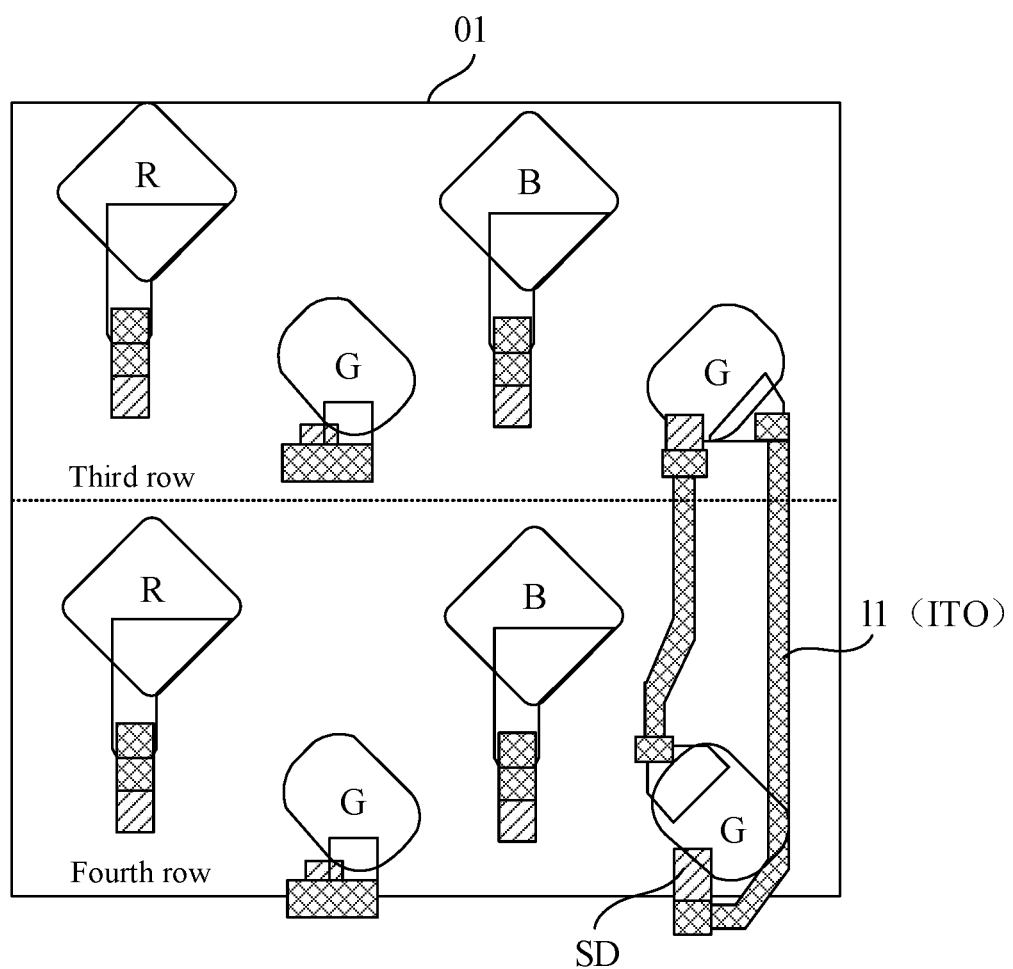
FIG. 9 is a structural layout of a display panel according to an embodiment of the present disclosure.

With reference to the structure shown in FIG. 5 and FIG. 7, for example, the at least one color is green G. FIG. 8 is a schematic structural diagram of still another display panel. FIG. 9 shows a partial structural layout of a display panel. As can be seen from FIG. 7 to FIG. 9, in the part of the pixels P1 in every row of pixels 031, the pixel circuit P11 and the light-emitting element L1 are arranged on the substrate 01 in a staggered manner and are coupled across rows.

Referring to FIG. 9, the figure shows the anode of the light-emitting element L1 and a signal line 11 (usually a transparent wire) by which the pixel circuit P11 is coupled to the light-emitting element L1, but does not show the pixel circuit P11. One terminal of the signal line 11 may be coupled to the anode of the light-emitting element L1, and the other terminal of the signal line 11 may be coupled to the pixel circuit P11 by a source-drain metal layer SD disposed on one side of the substrate 01. The signal line 11 is usually a transparent wire, and the material may be indium tin oxide (ITO).

It needs to be noted that, for the structure shown in FIG. 7, it may be considered that the position of the pixel circuit P11 in the pixel P1 is adjusted. Certainly, it may also be considered that in every row of pixels 031 included in at least one pixel group 03, the light-emitting element L1 included in each pixel P1 of part of the pixels P1 and the pixel circuit P11 included in each pixel P1 of the other pixels P1 are disposed in the same row. The pixel circuit P11 included in each pixel P1 of the part of the pixels P1 and the light-emitting element L1 are disposed in different rows. The pixel circuit P11 included in each pixel P1 of the other pixels P1 and the light-emitting element L1 are disposed in the same row. That is, the position of the light-emitting element L1 is adjusted.

It further needs to be noted that, referring to FIG. 9, in the row extension direction X1, the pixels P1 disposed in the same row are not disposed in the same row in a strict sense, but instead are further arranged in a staggered manner in the column extension direction X2. Therefore, in embodiments of the present disclosure, that the light-emitting element L1 included in each pixel P1 of part of the pixels P1 and the light-emitting element L1 included in each pixel P1 of other pixels P1 are disposed in the same row may refer to being disposed in the same row in divided regions in FIG. 9. The one row includes regions arranged in a staggered manner in the column extension direction X2 rather than the same row in a strict sense. FIG. 7 and FIG. 8 are only schematic description. Moreover, the case is similar for that the pixel circuits P11 included in the pixels P1 are disposed in the same row, and details are not described here.

Figure 10:
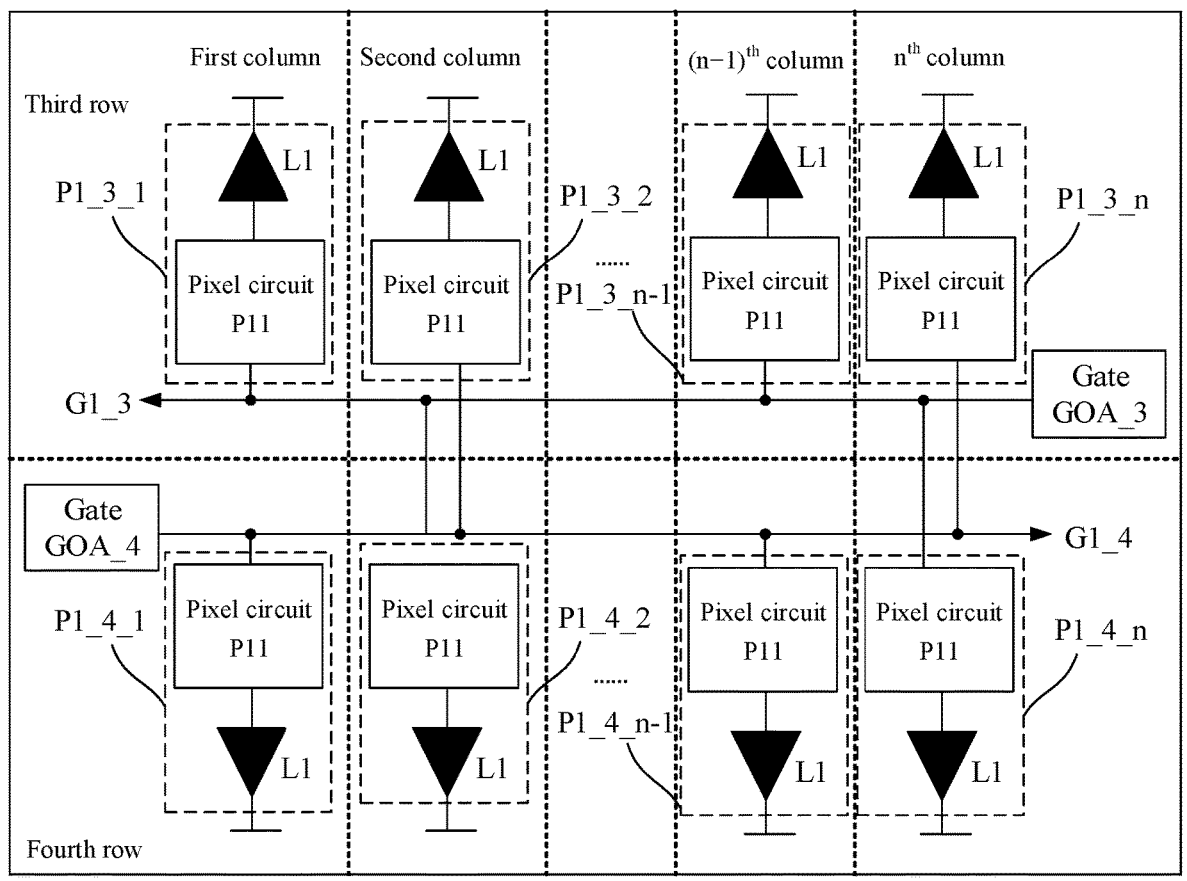
FIG. 10 is a schematic diagram of a coupling manner of part of pixels in another display panel according to an embodiment of the present disclosure.

Alternatively, as another optional embodiment, referring to FIG. 10, in every row of pixels 031 included in at least one pixel group 03, the light-emitting element L1 included in each pixel P1 of part of the pixels P1 and the light-emitting element L1 included in each pixel P1 of other pixels P1 are disposed in the same row. The pixel circuit P11 included in each pixel P1 of the part of the pixels P1 and the light-emitting element L1 are disposed in the same row. The pixel circuit P11 included in each pixel P1 of the other pixels P1 and the light-emitting element L1 are disposed in the same row. That is, it may be arranged that the pixel circuit P11 and the light-emitting element L1 are arranged in a non-staggered manner, but a connection manner between the pixel circuit P11 and the gate line G1 is adjusted to achieve the objective that the part of the pixels P1 and the other pixels P1 are all respectively coupled to the two gate lines G1.

For example, FIG. 10 only schematically shows one pixel group 03. The pixel group 03 includes the third row of pixels and the fourth row of pixels that are adjacent, and every row of pixels includes n columns of pixels. The first GOA units 021 coupled to the third gate line G1_3 is marked as "gate GOA_3". The first GOA units 021 coupled to the fourth gate line G1_4 is marked as "gate GOA_4".

As can be seen from FIG. 10, in the pixel P1_3_1 in the third row and the first column, the pixel P1_3_2 in the third row and the second column, the pixel P1_3_$n$-1 in the third row the and $(n-1)^{th}$ column, and the pixel P1_3_$n$ in the third row and the $n^{th}$ column, the pixel circuits P11 and the light-emitting elements L1 are all disposed in the same the third row. In addition, in the pixel P1_4_1 in fourth row and the first column, the pixel P1_4_2 in the fourth row and the second column, the pixel P1_4_$n$-1 in the fourth row and the $(n-1)^{th}$ column, and the pixel P1_4_$n$ in the fourth row and the $n^{th}$ column, the pixel circuits P11 and the light-emitting elements L1 are all disposed in the same fourth row. An improved part lies in that for the third row of pixels 031, in the pixel P1_3_1 disposed in the first column and the pixel P1_3_$n$-1 disposed in the $(n-1)^{th}$ column, the pixel circuits P11 are all coupled to the third gate line G1_3. In the pixel P1_3_2 disposed in the second column and the pixel P1_3_$n$ disposed in the $n^{th}$ column, the pixel circuits P11 are all coupled to the fourth gate line G1_4. Similarly, for the fourth row of pixels 031, in the pixel P1_4_1 disposed in the first column and the pixel P1_4_$n$-1 disposed in the $(n-1)^{th}$ column, the pixel circuits P11 are all coupled to the fourth gate line G1_4. In the pixel P1_4_2 disposed in the second column and the pixel P1_4_$n$ disposed in the $n^{th}$ column, the pixel circuits P11 are all coupled to the third gate line G1_3.

The foregoing is schematic description only using the first column, the second column, the $(n-1)^{th}$ column, and the $n^{th}$ column of pixels in every row of pixels 031, other columns of pixel coupling manners are similar. Reference may be made to records in the foregoing embodiments, and details are no longer described one by one.

In summary, embodiments of the present disclosure provide a display panel. The display panel includes a substrate including a display region and a GOA region, a plurality of rows and a plurality of columns of pixels disposed in the display region, and a first GOA circuit disposed in the GOA region. A plurality of first GOA units included in the first GOA circuit are coupled to a plurality of rows of pixels by a plurality of gate lines, and are configured to transmit gate drive signals to the plurality of rows of pixels, to drive the plurality of rows of pixels to emit light. By providing the plurality of first GOA units distributed on two sides of the substrate it is possible to make the brightness of individual pixels included in each row of pixels in part of rows of pixels of the plurality of rows of pixels to keep increasing, and the brightness of individual pixels included in each row of pixels in the other part of rows of pixels to keep decreasing in a direction from one side to the other side of the two sides, to solve the problem of macro display mura, and ensure that the display panel has a good display effect.

In addition, in two rows of pixels coupled to two first GOA units disposed on different sides by two gate lines, part of the pixels in at least one row of pixels are coupled to one of the two gate lines, and other pixels are coupled to the other one of the two gate lines, and it is possible to make brightness change trend of the at least one row of pixels to be as consistent as possible, that is, the brightness difference is small or even there is no brightness difference, thereby further ensuring a good display effect of the display panel.

Figure 11:
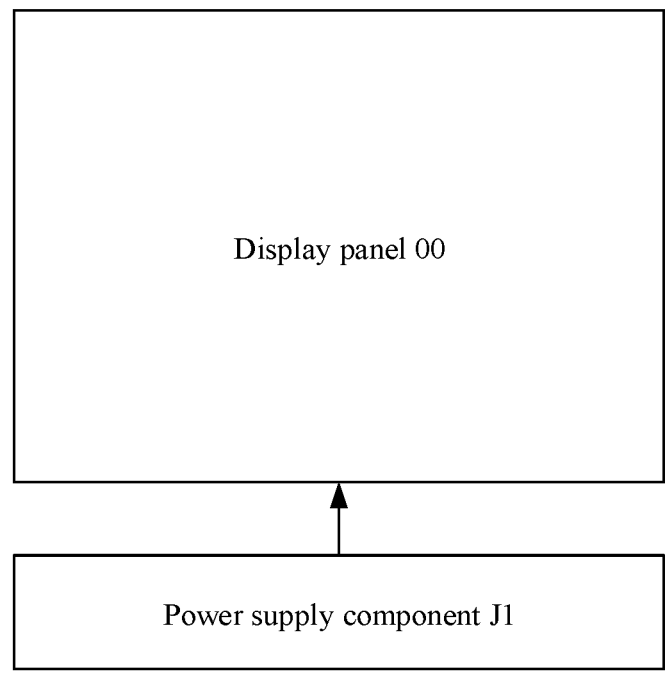
FIG. 11 is a schematic structural diagram of a display device according to an embodiment of the present disclosure.

FIG. 11 is a schematic structural diagram of the display device according to an embodiment of the present disclosure. As shown in FIG. 11, the display device includes a power supply component J1, and a display panel 00 shown in any foregoing drawing. The power supply component J1 is coupled to the display panel 00, and is configured to supply power to the display panel 00.

Optionally, the display device may be an OLED device, an AMOLED display device, a mobile phone, a tablet computer, a television, a display, or any other product or component having a display function.

Terms used in embodiments of the present disclosure are only used to explain specific embodiments of the present disclosure, but are not intended to limit the present disclosure. Unless otherwise defined, the technical terms and scientific terms used in implementations of the present disclosure have the same meaning as how they are generally understood by those of ordinary skill in the art to which the present disclosure pertains.

For example, terms such as "first", "second", and "third" used in embodiments of the present disclosure are only used to distinguish different components and do not intend to indicate any order, number or importance.

Similarly, "one", "a", and similar terms also do not represent a quantity limitation, but instead represents "at least one".

Similar terms such as "comprise" or "include" means that an element or object in front of "comprise" or "include" covers elements or objects listed behind "comprise" or "include" but do not exclude other elements or objects.

"Up", "down", "left", "right", or the like is only used to represent a relative location relationship. The relative location relationship may be correspondingly changed after the absolute locations of described objects are changed.

"and/or" represents that three relationships may exist. For example, A and/or B may represent the following three cases: Only A exists, both A and B exist, and only B exists. The character "/" usually represents that the associated objects have an "or" relationship.

The foregoing is merely optional embodiments of the present disclosure but is not used to limit the present disclosure. Any changes, equivalent replacements, and improvements made within the spirit and principle of the present disclosure shall fall within the protection scope of the present disclosure.

The invention claimed is:

1. A display panel, comprising:
   a substrate, wherein the substrate comprises a display region and a gate driver on array (GOA) region at least partially surrounding the display region;
   a plurality of gate lines, wherein the plurality of gate lines are disposed in the display region and the GOA region, each of the plurality of gate lines extends in a row extension direction, the plurality of gate lines are arranged in a column extension direction, and the row extension direction is intersected with the column extension direction;
   a first GOA circuit, wherein the first GOA circuit is disposed in the GOA region, the first GOA circuit comprises a plurality of cascaded first shift register units, part of the plurality of first shift register units are disposed on one side and other first shift register units except the part of the plurality of first shift register units are disposed on the other side in the row extension direction, and the plurality of first shift register units are coupled to the plurality of gate lines and are configured to transmit gate drive signals to the plurality of gate lines; and
   a plurality of pixel groups, wherein the plurality of pixel groups are disposed in the display region, at least one of the plurality of pixel groups comprises two rows and a plurality of columns of pixels arranged in an array in the row extension direction and the column extension direction, and two rows of pixels in the at least one pixel group are coupled to two of the plurality of gate lines, and the two rows of pixels are configured to emit light based on gate drive signals on the two gate lines, and
   wherein in at least one row of pixels comprised in the at least one pixel group, part of the pixels are coupled to one of the two gate lines coupled to the at least one pixel group, other pixels except the part of the pixels are coupled to the other one of the two gate lines coupled to the at least one pixel group, and first shift register units coupled to the one of the two gate lines and first shift register units coupled to the other one of the two gate lines are disposed on different sides;
   wherein the at least one row of pixels comprise a plurality of pixels of different colors; and
   in the plurality of pixels of different colors, part of pixels of a plurality of pixels of at least one color are coupled to the one of the two gate lines coupled to the at least one pixel group, and other pixels expect the part of the pixels are coupled to the other one of the two gate lines coupled to the at least one pixel group.

2. The display panel according to claim 1, wherein each of the pixels comprises a pixel circuit and a light-emitting element, the pixel circuit is respectively coupled to the gate line and the light-emitting element, and the pixel circuit is configured to transmit a light emission drive signal to the light-emitting element in response to the gate drive signals on the plurality of gate lines to drive the light-emitting element to emit light.

3. The display panel according to claim 2, wherein the light-emitting element comprised in each pixel of the part of the pixels and the light-emitting element comprised in each pixel of other pixels are disposed in a same row;
   the pixel circuit and the light-emitting element comprised in each pixel of the part of the pixels are disposed in different rows; and
   the pixel circuit and the light-emitting element comprised in each pixel of the other pixels are disposed in a same row.

4. The display panel according to claim 2, wherein the light-emitting element comprised in each pixel of the part of the pixels and the light-emitting element comprised in each pixel of other pixels are disposed in a same row;
   the pixel circuit and the light-emitting element comprised in each pixel of the part of the pixels are disposed in a same row; and
   the pixel circuit and the light-emitting element comprised in each pixel of the other pixels are disposed in a same row.

5. The display panel according to claim 1, wherein the at least one row of pixels comprises an even number of pixels; and
   a quantity of pixels comprised in the part of the pixels and a quantity of pixels comprised in other pixels are the same, and are equal to one half of a total quantity of pixels comprised in the at least one row of pixels.

6. The display panel according to claim 1, wherein two adjacent pixels are coupled to different gate lines in the at least one row of pixels.

7. The display panel according to claim 1, wherein the two rows of pixels comprised in the at least one pixel group are disposed in adjacent rows.

8. The display panel according to claim 1, wherein the at least one row of pixels comprise a plurality of red pixels, a plurality of green pixels and a plurality of blue pixels, and the at least one color is green.

9. The display panel according to claim 1, wherein the display panel further comprises:
   a plurality of light emission control lines, wherein the plurality of light emission control lines are disposed in the display region and the GOA region, each of the plurality of light emission control lines extends in the row extension direction, and the plurality of light emission control lines are arranged in the column extension direction; and a second GOA circuit disposed in the GOA region, wherein the second GOA circuit comprises a plurality of cascaded second shift register units, part of the second shift register units are disposed on one side and other second shift register units except the part of the second shift register units are disposed on the other side in the row extension direction, and the plurality of second shift register units are coupled to the plurality of light emission control lines, and are configured to transmit light emission control signals to the plurality of light emission control lines, wherein the two rows of pixels in the at least one pixel group are further coupled to two light emission control lines of the plurality of light emission control lines, and the two rows of pixels are configured to emit light based on light emission control signals on the two light emission control lines and the gate drive signals on the two coupled gate lines; and first shift register units coupled to the at least one row of pixels by the plurality of gate lines and second shift register units coupled to the at least one row of pixels by the plurality of light emission control lines are disposed on different sides.

10. The display panel according to claim 9, wherein in the plurality of first shift register units, first shift register units coupled to even-numbered rows of pixels by the plurality of gate lines are disposed on the one side; and first shift register units coupled to odd-numbered rows of pixels by the plurality of gate lines are disposed on the other side; and in the plurality of second shift register units, second shift register units coupled to even-numbered rows of pixels by the plurality of light emission control lines are disposed on the one side; and second shift register units coupled to odd-numbered rows of pixels by the plurality of light emission control lines are disposed on the other side.

11. The display panel according to claim 10, wherein the first shift register units and the second shift register units disposed on the one side are sequentially arranged in an order of one second shift register unit and one first shift register unit in the column extension direction; and the first shift register units and the second shift register units disposed on the other side are sequentially arranged in an order of one first shift register unit and one second shift register unit in the column extension direction.

12. The display panel according to claim 9, wherein in the at least one row of pixels comprised in the at least one pixel group, part of the pixels are coupled to one of the two light emission control lines coupled to the at least one pixel group, and other pixels except the part of the pixels are coupled to the other one of the two light emission control lines coupled to the at least one pixel group.

13. The display panel according to claim 1, wherein the row extension direction is perpendicular to the column extension direction.

14. A display device, comprising: a power supply component and the display panel according to claim 1; and wherein the power supply component is coupled to the display panel, and is configured to supply power to the display panel.

15. A display panel, comprising:
a substrate, wherein the substrate comprises a display region and a gate driver on array (GOA) region at least partially surrounding the display region;
a plurality of gate lines, wherein the plurality of gate lines are disposed in the display region and the GOA region, each of the plurality of gate lines extends in a row extension direction, the plurality of gate lines are arranged in a column extension direction, and the row extension direction is intersected with the column extension direction;
a first GOA circuit, wherein the first GOA circuit is disposed in the GOA region, the first GOA circuit comprises a plurality of cascaded first shift register units, part of the plurality of first shift register units are disposed on one side and other first shift register units expect the part of the plurality of first shift register units are disposed on the other side in the row extension direction, and the plurality of first shift register units are coupled to the plurality of gate lines and are configured to transmit gate drive signals to the plurality of gate lines; and
a plurality of pixel groups, wherein the plurality of pixel groups are disposed in the display region, at least one of the plurality of pixel groups comprises two rows and a plurality of columns of pixels arranged in an array in the row extension direction and the column extension direction, and two rows of pixels in the at least one pixel group are coupled to two of the plurality of gate lines, and the two rows of pixels are configured to emit light based on gate drive signals on the two gate lines, and
wherein in at least one row of pixels comprised in the at least one pixel group, part of the pixels are coupled to one of the two gate lines coupled to the at least one pixel group, other pixels expect the part of the pixels are coupled to the other one of the two gate lines coupled to the at least one pixel group, and first shift register units coupled to the one of the two gate lines and first shift register units coupled to the other one of the two gate lines are disposed on different sides;
wherein the at least one row of pixels comprises an even number of pixels; and
a quantity of pixels comprised in the part of the pixels and a quantity of pixels comprised in other pixels are the same, and are equal to one half of a total quantity of pixels comprised in the at least one row of pixels.

16. A display panel, comprising:
a substrate, wherein the substrate comprises a display region and a gate driver on array (GOA) region at least partially surrounding the display region;
a plurality of gate lines, wherein the plurality of gate lines are disposed in the display region and the GOA region, each of the plurality of gate lines extends in a row extension direction, the plurality of gate lines are arranged in a column extension direction, and the row extension direction is intersected with the column extension direction;
a first GOA circuit, wherein the first GOA circuit is disposed in the GOA region, the first GOA circuit comprises a plurality of cascaded first shift register units, part of the plurality of first shift register units are disposed on one side and other first shift register units expect the part of the plurality of first shift register units are disposed on the other side in the row extension direction, and the plurality of first shift register units are coupled to the plurality of gate lines and are configured to transmit gate drive signals to the plurality of gate lines; and
a plurality of pixel groups, wherein the plurality of pixel groups are disposed in the display region, at least one of the plurality of pixel groups comprises two rows and a plurality of columns of pixels arranged in an array in the row extension direction and the column extension direction, and two rows of pixels in the at least one pixel group are coupled to two of the plurality of gate lines, and the two rows of pixels are configured to emit light based on gate drive signals on the two gate lines, and wherein in at least one row of pixels comprised in the at least one pixel group, part of the pixels are coupled to one of the two gate lines coupled to the at least one pixel group, other pixels expect the part of the pixels are coupled to the other one of the two gate lines coupled to the at least one pixel group, and first shift register units coupled to the one of the two gate lines and first shift register units coupled to the other one of the two gate lines are disposed on different sides;

wherein the display panel further comprises:

a plurality of light emission control lines, wherein the plurality of light emission control lines are disposed in the display region and the GOA region, each of the plurality of light emission control lines extends in the row extension direction, and the plurality of light emission control lines are arranged in the column extension direction; and a second GOA circuit disposed in the GOA region, wherein the second GOA circuit comprises a plurality of cascaded second shift register units, part of the second shift register units are disposed on one side and other second shift register units expect the part of the second shift register units are disposed on the other side in the row extension direction, and the plurality of second shift register units are coupled to the plurality of light emission control lines, and are configured to transmit light emission control signals to the plurality of light emission control lines, wherein the two rows of pixels in the at least one pixel group are further coupled to two light emission control lines of the plurality of light emission control lines, and the two rows of pixels are configured to emit light based on light emission control signals on the two light emission control lines and the gate drive signals on the two coupled gate lines; and first shift register units coupled to the at least one row of pixels by the plurality of gate lines and second shift register units coupled to the at least one row of pixels by the plurality of light emission control lines are disposed on different sides.

17. The display panel according to claim 16, wherein in the plurality of first shift register units, first shift register units coupled to even-numbered rows of pixels by the plurality of gate lines are disposed on the one side; and first shift register units coupled to odd-numbered rows of pixels by the plurality of gate lines are disposed on the other side; and in the plurality of second shift register units, second shift register units coupled to even-numbered rows of pixels by the plurality of light emission control lines are disposed on the one side; and second shift register units coupled to odd-numbered rows of pixels by the plurality of light emission control lines are disposed on the other side.

18. The display panel according to claim 17, wherein the first shift register units and the second shift register units disposed on the one side are sequentially arranged in an order of one second shift register unit and one first shift register unit in the column extension direction; and the first shift register units and the second shift register units disposed on the other side are sequentially arranged in an order of one first shift register unit and one second shift register unit in the column extension direction.

19. The display panel according to claim 16, wherein in the at least one row of pixels comprised in the at least one pixel group, part of the pixels are coupled to one of the two light emission control lines coupled to the at least one pixel group, and other pixels expect the part of the pixels are coupled to the other one of the two light emission control lines coupled to the at least one pixel group.

* * * * *